Patented Apr. 30, 1946

2,399,355

UNITED STATES PATENT OFFICE 2,399,355

COMPOUNDS OF THE NAPHTHOQUINONE SERIES

David X. Klein, Wilmington, Del., assignor to E. I. du Pont de Nemours & Company, Wilmington, Del., a corporation of Delaware No Drawing. Application November 15, 1943, Serial No. 510,364

4 Claims. (Cl. 260—396)

This invention relates to the preparation of new compounds of the naphthoquinone series, and has for its object the preparation of new dyes of this class for use in the coloring of cellulose esters and ethers. It is a further object of the invention to provide new dyes for cellulose esters and ethers, such as cellulose acetate, etc., which exhibit improved tinctorial value over analogous compounds of the anthraquinone series, and which have good fastness to gas fumes.

The aminoanthraquinone compounds, which dye cellulose acetate in blue and green shades, do not exhibit the tinctorial strength desired for dyeing this fiber, and, unless otherwise modified in their molecular structure, are not fast to gas fumes. Lack of fastness to gas fumes has been found to be extremely detrimental in the use of the anthraquinone type compounds in this color range on cellulose acetate, for, where the goods are stored for extended periods of time and are likely to be subjected to ordinary fumes from heating systems, etc., the parts with which the gas fumes come into contact changed materially in shade, rendering bolts of such dyed cloth unsuitable for use.

I have found that dyes for cellulose acetate and related fibers which dye that material in blue and green shades can be produced in the naphthoquinone series, and that these dyes exhibit materially increased tinctorial strength on application to the cellulose acetate, and have superior gas fume fastness.

These new dyes are produced by reacting primary alkylamines with 5,8-dihydroxy-2,3-dihydro-1,4-naphthoquinone so that an alkylamine group is introduced into each of the positions 1 and 4 in the naphthoquinone molecule. The resulting leuco compound is oxidized to the keto form either in situ or after isolation from the reaction medium. These products are applied to cellulose acetate by the usual methods of dyeing this fiber with water-insoluble anthraquinone derivatives.

The following examples are given to illustrate the invention. The parts used are by weight, unless otherwise specified.

Example 1

9.6 parts of leuco-naphthazarine are stirred with 20 parts of pyridine, and, after expelling the air from the reaction vessel by use of nitrogen, 12.4 parts of a 30% aqueous solution of methylamine are added and the mass is then heated to 60° C. under reflux for 2 hours. The reaction mass is then cooled to 30° C., and after adding 0.1 part of copper acetate, the mass is air blown at 30° C. It is then filtered, washed with a dilute pyridine-water solution, and then with clear water, and finally dried. The resulting 1,4-di-(methylamino)-5,8-naphthoquinone, which has a nitrogen content of 12.42% and a melting point of 200° C., is obtained in a yield of approximately 50% of theory. This product dyes cellulose acetate in bright greenish-blue shades having superior gas fume fastness to the corresponding 1,4-di-(methylamino)-anthraquinone, although it is somewhat inferior in light fastness.

Example 2

Where, in the preceding example, 20 parts of methanol are substituted for the pyridine, and 16.2 parts of the 33% aqueous solution of ethylamine is reacted with the leuco-naphthazarine at about 40° C., a 1,4-di-(ethylamino)-5,8-naphthoquinone is obtained having a nitrogen content of 10.99% and a melting point of 146° C. This product dyes cellulose acetate in blue-green shades.

Example 3

19.2 parts of leuco-naphthazarine in 40 parts of pyridine are reacted with 27 parts of epsilon-cyanopentylamine in the absence of air (the reaction vessel flushed with nitrogen) by heating at 60° C. for 2 hours. On cooling, the heavy crystalline mass is filtered, sucked dry and washed with alcohol. On oxidation of the resulting cake by standing in air, a yield of approximately 39% theory of the 1,4-di-(epsilon-cyanopentylamino)-5,8-naphthoquinone is obtained which has a nitrogen content of 14.35% and a melting point of 124° C. This product dyes cellulose acetate in bright greenish-blue shades of good gas fume fastness.

Example 4

10 parts of leuco-naphthazarine in 20 parts of pyridine are reacted with 7.1 parts of isopropylamine in an atmosphere of nitrogen by heating at 60° for 3 hours, and then raising the temperature to 100° for 1 hour. On cooling, a heavy precipitate of the leuco compound is formed. After adding 0.1 part of copper acetate and 1 part of piperidine, the solution is air blown at 25° C. until the yellow has been entirely converted to blue crystals. The mass is then filtered, washed with a 50% pyridine-water solution followed by a wash with 25% pyridine solution in water, and finally with water. The resulting product, which is the 1,4-di-(isopropylamino)-5,8-naphthoquinone which has a nitrogen content of 10.13% and a melting point of 173° C., dyes cellulose acetate in attractive bright blue-green shades of good fastness to gas fumes and light.

Example 5

Where 8.76 parts of n-butylamine are substituted for the isopropylamine in Example 4, the 1,4-di-(n-butylamino)-5,8-naphthoquinone having a nitrogen content of 9.93% and a melting point of 107° C., is obtained which dyes cellulose acetate in blue-green shades and which has good gas fume and light fastness.

Example 6

Where isobutylamine is substituted in Example 4 for the isopropylamine, the resulting 1,4-di-(isobutylamino)-5,8-naphthoquinone is obtained having a nitrogen content of 9.73% and a melting point of 141° C. This product exhibits dyeing properties similar to the isopropyl derivatives.

Example 7

Where secondary butylamine is employed in Example 4, the 1,4-di-(sec.butylamino)-5,8-naphthoquinone having a nitrogen content of 8.99% and a melting point of 119° C. is obtained, which dyes cellulose acetate in blue-green shades having good gas fume and light fastness.

In the preparation of the compounds of this class, it is essential that the reaction with the alkylamine be carried out with the leuco-naphthazarine, for a product having different chemical properties is obtained where one attempts to reduce the naphthazarine itself in situ during the condensation.

The reaction is carried out preferably with only slightly more of the alkylamine than that theoretically required to produce the dialkylamino derivative, and the oxidation of the resulting leuco derivative, if carried out in the reaction mass without isolation, is preferably accomplished at temperatures under 30° C. to avoid the formation of by-products. It is also essential that air be excluded from the reaction mass during the condensation, and it is preferred to add the amine to the reaction mass last, for undue oxidation of the leuco derivative takes place when the mass becomes alkaline. Any of the alkylamines, such as the normal or branched chain alkylamines, as well as those carrying simple substituents such as the —CN group, may be employed to give the corresponding dialkyl derivatives.

I claim:
1. 1,4-di-(alkylamino)-5,8-naphthoquinone in which the alkyl groups contain from 1 to 5 carbon atoms.
2. 1,4-di-(isopropylamino)-5,8-naphthoquinone.
3. 1,4-di-(methylamino)-5,8-naphthoquinone.
4. 1,4-di-(sec.butylamino)-5,8-naphthoquinone.

DAVID X. KLEIN.